United States Patent
Liang et al.

(10) Patent No.: US 10,960,901 B2
(45) Date of Patent: Mar. 30, 2021

(54) ELECTROMAGNETIC TRANSVERSE ACTIVE DAMPING SYSTEM, AND CONTROL METHOD AND APPARATUS THEREFOR

(71) Applicant: CRRC QINGDAO SIFANG CO., LTD., Shandong (CN)

(72) Inventors: Jianying Liang, Shandong (CN); Donghua Wu, Shandong (CN); Shi Xiao, Shandong (CN); Fujie Jiang, Shandong (CN); Yanmin Li, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 0 days.

(21) Appl. No.: 16/958,722

(22) PCT Filed: Mar. 6, 2019

(86) PCT No.: PCT/CN2019/077120
§ 371 (c)(1),
(2) Date: Jun. 28, 2020

(87) PCT Pub. No.: WO2020/024592
PCT Pub. Date: Feb. 6, 2020

(65) Prior Publication Data
US 2020/0377131 A1    Dec. 3, 2020

(30) Foreign Application Priority Data
Aug. 1, 2018 (CN) .......................... 201810865264.1

(51) Int. Cl.
*B61F 5/24* (2006.01)
*B60L 13/08* (2006.01)

(52) U.S. Cl.
CPC .............. *B61F 5/245* (2013.01); *B60L 13/08* (2013.01)

(58) Field of Classification Search
CPC .......... B60L 13/04; B60L 13/06; B60L 13/08; B60L 13/10; B61F 5/24; B61F 5/245
(Continued)

(56) References Cited

U.S. PATENT DOCUMENTS 3,902,691 A * 9/1975 Ott ........................... B61F 5/22
                                                        246/167 R
4,440,093 A * 4/1984 Kakehi ................ B60G 17/018
                                                        105/164
(Continued)

FOREIGN PATENT DOCUMENTS

| CN | 101357640 A | 2/2009 |
| CN | 202071848 U | 12/2011 |

(Continued)

OTHER PUBLICATIONS

International Search Report for PCT/CN2019/077120 dated May 29, 2019, ISA/CN.
(Continued)

*Primary Examiner* — Zachary L Kuhfuss
(74) *Attorney, Agent, or Firm* — Yue (Robert) Xu; Apex Attorneys at Law, LLP

(57) ABSTRACT

Disclosed are an electromagnetic transverse active damping system, and a control method and apparatus therefor. The electromagnetic transverse active damping system comprises an electromagnet controller, wherein the electromagnet controller can determine a value of a damper target gap for an electromagnet active damper according to acquired train transverse acceleration, train position information and train speed, and control the action of the electromagnet active damper according to the determined value of the
(Continued)

damper target gap; and electrical control is employed during the control of the electromagnet active damper by the electromagnet controller.

13 Claims, 2 Drawing Sheets

(58) Field of Classification Search
USPC .......................... 105/171, 185, 201; 104/284
See application file for complete search history.

(56) References Cited

U.S. PATENT DOCUMENTS

| | | | | |
|---|---|---|---|---|
| 4,585,282 | A * | 4/1986 | Bosley | F16G 32/0451 |
| | | | | 104/284 |
| 5,868,077 | A * | 2/1999 | Kuznetsov | B60L 13/04 |
| | | | | 104/281 |
| 9,162,688 | B2 * | 10/2015 | Gotou | B61F 5/245 |
| 2013/0158754 | A1 * | 6/2013 | Gotou | B61F 99/00 |
| | | | | 701/19 |
| 2015/0183443 | A1 * | 7/2015 | Iwamura | F16F 15/03 |
| | | | | 188/267 |
| 2018/0170407 | A1 | 6/2018 | Ogawa | |

FOREIGN PATENT DOCUMENTS

| | | |
|---|---|---|
| CN | 202115536 U | 1/2012 |
| CN | 104121319 A | 10/2014 |
| CN | 104842735 A | 8/2015 |
| CN | 104851300 A | 8/2015 |
| CN | 107848548 A | 3/2018 |
| CN | 109094599 A | 12/2018 |
| EP | 0615890 B1 | 7/1997 |
| EP | 2796745 A1 | 10/2014 |
| JP | H05162643 A | 6/1993 |
| JP | H05319256 A | 12/1993 |
| JP | H0614413 A | 1/1994 |
| JP | 2002211390 A | 7/2002 |
| JP | 2006027328 A | 2/2006 |
| JP | 2009101961 A | 5/2009 |
| JP | 2012040929 A | 3/2012 |
| JP | 5027578 B2 | 9/2012 |
| KR | 20060057256 A | 5/2006 |
| WO | 2016098773 A1 | 6/2016 |
| WO | 2017164133 A1 | 9/2017 |

OTHER PUBLICATIONS

CNIPA First Office Action corresponding to Application No. 201810865264.1; dated of Apr. 23, 2019.
First Office Action dated Jan. 4, 2021 for Japanese patent application No. 2020-536786, English translation provided by Unitalen.

* cited by examiner

ELECTROMAGNETIC TRANSVERSE ACTIVE DAMPING SYSTEM, AND CONTROL METHOD AND APPARATUS THEREFOR

The present application is the national phase of International Application No. PCT/CN2019/077120, filed on Mar. 6, 2019, which claims priority to claims priority to Chinese Patent Application No. 201810865264.1, titled "ELECTROMAGNETIC TRANSVERSE INITIACTIVE DAMPING SYSTEM, AND CONTROL METHOD AND APPARATUS THEREFOR", filed on Aug. 1, 2018 with the Chinese Patent Office, both of which is incorporated herein by reference in their entirety.

FIELD

The present disclosure relates to the technical field of vehicles, and in particular to an electromagnetic lateral initiative vibration damping system, and a method and an apparatus for controlling the electromagnetic lateral initiative vibration damping system.

BACKGROUND

At present, the speed of high-speed trains is increasingly fast. For example, the maximum speed of magnetic levitation trains that are to be came into use may reach 503 kilometers per hour. During traveling at such a high speed, a carriage of the high-speed train may tilt or shake when the high-speed train travels on a bumpy railway or the high-speed train turns, reducing experience of passengers on the train.

In order to reduce occurrence that the carriage of the high-speed train tilts or shakes during traveling, a lateral vibration damping apparatus may be mounted on a bogie of the high-speed train. When the high-speed train travels on the bumpy railway or turns, the lateral vibration damping apparatus is controlled by an apparatus or elastic element that generates active force or active torque.

The lateral vibration damping apparatus has a slow response speed and cannot operate timely, resulting in poor control accuracy.

SUMMARY

In order to solve the above problems, an object of embodiments of the present disclosure is to provide an electromagnetic lateral initiative vibration damping system, and a method and an apparatus for controlling the electromagnetic lateral initiative vibration damping system.

In a first aspect, an electromagnetic lateral initiative vibration damping system is provided according to an embodiment of the present disclosure. The electromagnetic lateral initiative vibration damping system includes an electromagnet controller, a lateral acceleration sensor, an electromagnet initiative vibration damper, and a computing device.

The electromagnet controller is connected to the lateral acceleration sensor, the electromagnet initiative vibration damper, and the computing device.

The lateral acceleration sensor is configured to acquire train lateral acceleration of a magnetic levitation train and transmit the acquired train lateral acceleration to the electromagnet controller.

The computing device is configured to acquire train position information and a train speed of the magnetic levitation train, and transmit the acquired train position information and train speed to the electromagnet controller.

The electromagnet controller is configured to determine a vibration damper target gap value of the electromagnet initiative vibration damper based on the acquired train lateral acceleration, the train position information and the train speed, and control, based on the determined vibration damper target gap value, the electromagnet initiative vibration damper to operate.

The electromagnet initiative vibration damper is configured to move from a default position to a position specified by the vibration damper target gap value under the control of the electromagnet controller.

In a second aspect, a method for controlling the electromagnetic lateral initiative vibration damping system is provided according to an embodiment of the present disclosure. The method includes: acquiring train lateral acceleration, train position information and train speed; determining a vibration damper target gap value of an electromagnet initiative vibration damper based on the acquired train lateral acceleration, the train position information and the train speed, and controlling, based on the determined vibration damper target gap value, the electromagnet initiative vibration damper to operate.

In a third aspect, an apparatus for controlling the electromagnetic lateral initiative vibration damping system is provided according to an embodiment of the present disclosure. The apparatus includes an acquisition module and a control module.

The acquisition module is configured to acquire train lateral acceleration, train position information and train speed.

The control module is configured to determine a vibration damper target gap value of an electromagnet initiative vibration damper based on the acquired train lateral acceleration, the train position information and the train speed, and control, based on the determined vibration damper target gap value, the electromagnet initiative vibration damper to operate.

In solutions provided in the above first to third aspects of the embodiments of the present disclosure, the electromagnet initiative vibration damper is controlled by the electromagnet controller provided in the electromagnetic lateral initiative vibration damping system. Compared with the related technology in which a lateral vibration damping apparatus is controlled by an apparatus or elastic element that generates active force or active torque, the electromagnet controller controls the electromagnet initiative vibration damper in an electronic control manner, which improves a response speed of the electromagnetic lateral initiative vibration damping system, so that the electromagnetic lateral initiative vibration damping system can operate timely at a position where a carriage of a high-speed train tilts or shakes.

In order to make the above objects, features and advantages of the present disclosure more comprehensible, the present disclosure is described in detail below with preferred embodiments in conjunction with the accompanying drawings.

BRIEF DESCRIPTION OF THE DRAWINGS

In order to more clearly illustrate embodiments of the present disclosure, the drawings to be used in the description of the embodiments or the conventional technology are briefly described below. Apparently, the drawings in the following description show only some embodiments of the present disclosure, and other drawings may be obtained by those skilled in the art from the drawings without any creative work.

In the drawings.

Figure 1:
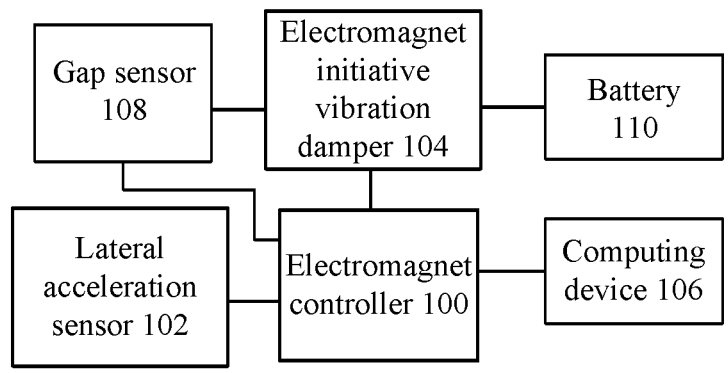
FIG. 1 is a schematic structural diagram of an electromagnetic lateral initiative vibration damping system according to a first embodiment of the present disclosure.

| | |
|---|---|
| 100 electromagnet controller; | 102 lateral acceleration sensor; |
| 104 electromagnet initiative vibration damper; | |
| 106 computing device | 108 gap sensor; |
| 110 battery; | 112 bogie; |
| 400 acquisition module; | 402 control module. |

DETAILED DESCRIPTION OF EMBODIMENTS

Technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

At present, in order to avoid a case that a carriage of a high-speed train tilts or shakes when the high-speed train travels on a bumpy railway or turns, a lateral vibration damping apparatus may be arranged on a bogie of the high-speed train. From a perspective of vibration control, the lateral vibration damping apparatus may be but not limited to an initiative lateral vibration damping apparatus and a passive lateral vibration damping apparatus. The initiative lateral vibration damping apparatuses may be classified into active initiative lateral vibration damping apparatuses and passive initiative lateral vibration damping apparatuses, depending on whether requiring external energy during operation.

The above active initiative lateral vibration damping apparatus is also referred to as a full-initiative lateral vibration damping apparatus, and generally includes an apparatus that generates active force or active torque (an oil cylinder, an air cylinder, a servo motor, and an electromagnet), a measurement element (an acceleration sensor, a speed sensor, a force sensor and the like), a feedback control system, and a power source that can continuously supply energy.

The above passive initiative lateral vibration damping apparatus is also referred to as a semi-initiative lateral vibration damping apparatus, and includes a damping element and an elastic element with no energy input but capable of performing control. A vibration damping manner and operation principle of the passive initiative lateral vibration damping apparatus are similar as that of the passive lateral vibration damping apparatus. A difference is that the parameter of the passive lateral vibration damping apparatus cannot be adjusted, while the parameter of the passive initiative lateral vibration damping apparatus can be arbitrarily adjusted within a certain range so as to achieve better vibration damping effect.

A difference between the semi-initiative lateral vibration damping apparatus and the full-initiative lateral vibration damping apparatus is that the semi-initiative lateral vibration damping apparatus adjusts only a magnitude of damping force, while the full-initiative lateral vibration damping apparatus adjusts both the magnitude and direction of the damping force. A core of the semi-initiative lateral vibration damping apparatus is actually a vibration damper with adjustable damping, and the magnitude of damping force is generally obtained by adjusting opening of an orifice. A constraint condition on the damping force is that energy related to a damper is completely dissipated when a system vibrates.

When a high-speed train provided with the above lateral vibration damping apparatus travels on a bumpy railway or turns, the lateral vibration damping apparatus is controlled by an apparatus or elastic element that generates the active force or the active torque, so that the lateral vibration damping apparatus operates. However, operation of the above lateral vibration damping apparatus is controlled by a mechanical device such as the apparatus or the elastic element that generates the active force or active torque. Operation time is generally tens of seconds, resulting in a slow response speed of the lateral vibration damping apparatus. The lateral vibration damping apparatus cannot operate timely. Control accuracy is poor. Based on this, an electromagnetic lateral initiative vibration damping system, and a method and an apparatus for controlling the electromagnetic lateral initiative vibration damping system are provided according to the present disclosure. The electromagnet initiative vibration damper is controlled by the electromagnet controller. The electromagnet controller controls the electromagnet initiative vibration damper in an electronic control manner, which improves the response speed of the electromagnetic lateral initiative vibration damping system, so that the electromagnetic lateral initiative vibration damping system can operate timely at a position where the carriage of the high-speed train tilts or shakes.

In solutions of the present disclosure, an electromagnet controller is arranged in the electromagnetic lateral initiative vibration damping system. The electromagnet controller determines the vibration damper target gap value of the electromagnet initiative vibration damper based on acquired train lateral acceleration, train position information and train speed, and controls, based on the determined vibration damper target gap value, the electromagnet initiative vibration damper to operate. The electromagnet controller controls the electromagnet initiative vibration damper in an electronic control manner, which improves the response speed of the electromagnetic lateral initiative vibration damping system, so that the electromagnetic lateral initiative vibration damping system can operate timely at a position where the carriage of the high-speed train tilts or shakes.

In order to make the above objects, features and advantages of the present disclosure more comprehensible, the disclosure is described in further detail below with reference to the drawings and specific embodiments.

First Embodiment

Reference is made to FIG. 1, which is a schematic structural diagram of an electromagnetic lateral initiative vibration damping system. The electromagnetic lateral initiative vibration damping system according to this embodiment may include an electromagnet controller 100, a lateral acceleration sensor 102, an electromagnet initiative vibration damper 104, and a computing device 106.

The electromagnet controller 100 is connected to the lateral acceleration sensor 102, the electromagnet initiative vibration damper 104, and the computing device 106.

The lateral acceleration sensor 102 and the electromagnet initiative vibration damper 104 in the electromagnetic lateral initiative vibration damping system may be arranged on a bogie of a magnetic levitation train.

The electromagnet controller 100 may be arranged in a control system of the magnetic levitation train, and may be connected to the lateral acceleration sensor 102, the electromagnet initiative vibration damper 104 and the computing device 106 in a wired or wireless manner, so as to perform data interaction with the lateral acceleration sensor 102, the electromagnet initiative vibration damper 104 and the computing device 106.

The computing device 106, similar as the electromagnet controller 100, may be arranged in the control system of the magnetic levitation train.

The lateral acceleration sensor 102 is configured to acquire train lateral acceleration of the magnetic levitation train and transmit the acquired train lateral acceleration to the electromagnet controller 100.

The computing device 106 is configured to acquire train position information and a train speed of the magnetic levitation train, and transmit the acquired train position information and train speed to the electromagnet controller 100.

The computing device 106 may acquire the train position information of the magnetic levitation train via a train position detection sensor prearranged on the magnetic levitation train.

The train position information may include position coordinates and/or longitude and latitude of a position at which the train is located.

The computing device 106 may acquire the train speed via a speed sensor prearranged on the magnetic levitation train.

The computing device 106 may adopt any of server, portable computer, and mobile terminal that are capable of acquiring the train position information and the train speed of the magnetic levitation train in the conventional technology, which are not listed herein.

The electromagnet controller 100 is configured to determine a vibration damper target gap value of the electromagnet initiative vibration damper 104 based on the acquired train lateral acceleration, the train position information and the train speed, and control, based on the determined vibration damper target gap value, the electromagnet initiative vibration damper 104 to operate.

Specifically, the electromagnet controller is configured to determine the vibration damper target gap value of the electromagnet initiative vibration damper based on the acquired train lateral acceleration, the train position information and the train speed, and control, based on the determined vibration damper target gap value, the electromagnet initiative vibration damper to operate, by performing the following steps (1) to (6).

In step (1), in a case that there is a vibration damping point that the magnetic levitation train has not passed on a traveling route of the magnetic levitation train, vibration damping point position information of the vibration damping point that the magnetic levitation train has not passed is acquired.

In step (2), a distance between the magnetic levitation train and the vibration damping point that the magnetic levitation train has not passed is calculated based on the train position information and the vibration damping point position information. A vibration damping point closest to the magnetic levitation train is determined based on the calculated distance.

In step (3), a passing time instant when the magnetic levitation train passes the vibration damping point closest to the magnetic levitation train is determined based on the train speed and the distance between the magnetic levitation train and the vibration damping point closest to the magnetic levitation train.

In step (4), lateral acceleration at which the magnetic levitation train passes the vibration damping point closest to the magnetic levitation train is predicted based on the train lateral acceleration and the passing time instant when the magnetic levitation train passes the vibration damping point closest to the magnetic levitation train.

In step (5), in a case that the predicted lateral acceleration is not equal to the train lateral acceleration, a difference between the predicted lateral acceleration and the train lateral acceleration is calculated. The calculated difference is determined as vibration damper vibration offset inertia when the magnetic levitation train passes the vibration damping point closest to the magnetic levitation train.

In step (6), the vibration damper target gap value of the electromagnet initiative vibration damper is determined based on the calculated vibration damper vibration offset inertia. The electromagnet initiative vibration damper is controlled based on the vibration damper target gap value, to operate.

In the above step (1), the electromagnet controller may acquire the vibration damping point position information of the vibration damping point that the magnetic levitation train has not passed from a pre-stored train route map.

The vibration damping point refers to a position on the traveling route where the magnetic levitation train turns or the railway is bumpy. The vibration damping point on the traveling route is determined by staff after surveying the traveling route in advance. The vibration damping point position information of the vibration damping points is stored in the train route map.

The train route map is used to record the vibration damping point position information of the vibration damping point and passing status of the magnetic levitation train. The passing status of the magnetic levitation train may include a passed state and a non-passed state. The passed state and the non-passed state are indicated by different passing state identifiers.

In an embodiment, in the train route map, a vibration damping point that the magnetic levitation train has passed carries a passed state identifier, and a vibration suspension point that the magnetic levitation train has passed carries a non-passed state identifier.

Therefore, the electromagnet controller may determine the vibration damping point that the magnetic levitation train has not passed by detecting a vibration damping point that carries the non-passed state identifier in the train route map.

The vibration damping point position information may include position coordinates and/or longitude and latitude of a position.

In the above step (2), the distance between the magnetic levitation train and the vibration damping point that the magnetic levitation train has not passed may be calculated in any manner of calculating a distance between two points based on coordinates of the two points in the conventional technology, or any manner of calculating a distance between two points based on latitudes and longitudes of the two points in the conventional technology, which are not described in detail herein.

A vibration damping point with a smallest distance from the magnetic levitation train among the vibration damping points that magnetic levitation train has not passed is determined as the vibration damping point closest to the magnetic levitation train.

In the above step (3), a time period after which the magnetic levitation train passes the vibration damping point closest to the magnetic levitation train is calculated from the following formula.

$$T=B/A$$

where B represents a distance between a magnetic levitation train and a vibration damping point closest to the magnetic levitation train, A represents a train speed of the magnetic levitation train, and T represents a time period required for the magnetic levitation train to reach the vibration damping point closest to the magnetic levitation train.

After T is calculated, the calculated T is added to a current time instant to obtain the passing time instant when the magnetic levitation train passes the vibration damping point closest to the magnetic levitation train.

For example, if T represents a time period of 2 minutes and the current time instant is 16:24, the electromagnet controller can determine that the magnetic levitation train passes the vibration damping point closest to the magnetic levitation train at a time instant of 16:26. The time instant of 16:26 is determined as the passing time instant.

In order to predict the lateral acceleration at which the magnetic levitation train passes the vibration damping point closest to the magnetic levitation train, the above step (4) may include the following steps (41) to (42).

In step (41), the train lateral acceleration and the passing time instant are inputted into a neural network.

In step (42), the lateral acceleration at which the magnetic levitation train passes the vibration damping point closest to the magnetic levitation train is predicted through the neural network.

In the above step (42), the lateral acceleration at which the magnetic levitation train passes the vibration damping point closest to the magnetic levitation train may be predicted by using any neural network algorithm in the conventional technology, which is not described in detail herein.

The above step (5) may include the following steps (51) to step (53).

In step (51), it is determined whether the predicted lateral acceleration is equal to the train lateral acceleration. If the predicted lateral acceleration is equal to the train lateral acceleration, the process ends. If the predicted lateral acceleration is not equal to the train lateral acceleration, step (52) is performed.

In step (52), the difference between the predicted lateral acceleration and the train lateral acceleration is calculated.

In step (53), the calculated difference is determined as the vibration damper vibration offset inertia when the magnetic levitation train passes the vibration damping point closest to the magnetic levitation train.

In the above step (53), the vibration damper vibration offset inertia may also be referred to as vibration offset inertia, and is used to represent an inertia value that the carriage tilts or shakes in a lateral direction when magnetic levitation train travels on the bumpy railway or turns.

The above step (6) may include the following steps (61) to step (64).

In step (61), a vibration damper gap and a vibration damper operation duration that are corresponding to the vibration damper vibration offset inertia are determined based on a correspondence among the vibration offset inertia, the vibration damper gap and the vibration damper operation duration.

In step (62), the vibration damper gap corresponding to the vibration damper vibration offset inertia is determined as the vibration damper target gap value of the electromagnet initiative vibration damper.

In step (63), a time instant at which the electromagnet initiative vibration damper operates is determined based on the vibration damper operation duration and the passing time instant when the magnetic levitation train passes the vibration damping point closest to the magnetic levitation train.

In step (64), when the time instant at which the electromagnet initiative vibration damper operates comes, the electromagnet initiative vibration damper is controlled, based on the vibration damper target gap value, to operate.

In the above step (61), the correspondence among the vibration offset inertia, the vibration damper gap and the vibration damper operation duration is stored in the electromagnet controller in advance.

In the correspondence among the vibration offset inertia, the vibration damper gap and the vibration damper operation duration, the vibration damper gaps and the vibration damper operation durations corresponding to different vibration offset inertia are data obtained by the staff after performing various tests when the magnetic levitation train travels on the bumpy railway or turns. The vibration damper gaps and the vibration damper operation durations corresponding to different vibration offset inertia are stored in the electromagnet controller.

In the above step (63), the time instant at which the electromagnet initiative vibration damper operates is equal to the passing time instant minus the vibration damper operation duration.

For example, the vibration damper operation duration is equal to 4 seconds, and the passing time instant is 16:26, the time instant at which the electromagnet initiative vibration damper operates is 16:25:56.

The electromagnet controller 100 may adopt any of processor, microprocessor or single-chip microcomputer capable of controlling the electromagnet initiative vibration damper 104 in the conventional technology, which are not listed herein.

The electromagnet initiative vibration damper 104 is configured to move from a default position to a position specified by the vibration damper target gap value under the control of the electromagnet controller 100.

In an embodiment, the electromagnet initiative vibration damper 104 includes a cylinder sleeve and an electromagnetic piston arranged in the cylinder sleeve.

The electromagnetic piston may be moved from the default position in the cylinder sleeve to the position specified by the vibration damper target gap value under the control of the electromagnet controller 100.

The vibration damper target gap value indicates a distance between the electromagnetic piston and a bottom of the cylinder sleeve.

In a case that the magnetic levitation train travels straight on a railway having a flat surface, the electromagnetic piston is at the default position in the cylinder sleeve, and vibration damping operation is not required.

When the magnetic levitation train is to turn, or is to travel on a bumpy railway, the electromagnet controller 100 will control the electromagnetic piston to operate, so as to perform the vibration damping operation.

In an embodiment, the electromagnetic piston may be provided with an elastic electromagnetic element. When the electromagnetic piston moves to the position specified by the vibration damper target gap value in the cylinder sleeve, the elastic electromagnetic element is stretched or compressed. Therefore, after the electromagnetic piston moves to the position specified by the vibration damper target gap value in the cylinder sleeve, the elastic electromagnetic element can restore a default shape relying on its own elastic force without the control of the electromagnet controller while controlling the electromagnetic piston to return from the position specified by the vibration damper target gap value to the default position in the cylinder sleeve. In addition, electric energy is generated during the process that the electromagnetic piston returns from the position specified by the vibration damper target gap value to the default position in the cylinder sleeve.

In summary, with the electromagnetic lateral initiative vibration damping system according to this embodiment, the electromagnet initiative vibration damper is controlled by the electromagnet controller provided in the electromagnetic lateral initiative vibration damping system. Compared with the related technology in which a lateral vibration damping apparatus is controlled by an apparatus or elastic element that generates active force or active torque, the electromagnet controller controls the electromagnet initiative vibration damper in an electronic control manner, which improves a response speed of the electromagnetic lateral initiative vibration damping system, so that the electromagnetic lateral initiative vibration damping system can operate timely at a position where a carriage of a high-speed train tilts or shakes.

In order to ensure the control accuracy of the electromagnetic lateral initiative vibration damping system, the electromagnetic lateral initiative vibration damping system according to this embodiment may further include a gap sensor 108. The gap sensor 108 is connected to the electromagnet controller 100 and the electromagnet initiative vibration damper 104.

The gap sensor 108 may be arranged at a position near the electromagnet initiative vibration damper 104 in the bogie, and is configured to acquire a gap value during operation of the electromagnet initiative vibration damper 104, and transmit the acquired gap value to the electromagnet controller 100.

The electromagnet controller 100 is further configured to receive the gap value transmitted by the gap sensor 108, and determine that the electromagnet initiative vibration damper 104 moves to the position specified by the vibration damper target gap value in a case that gap value is equal to the vibration damper target gap value, to complete control on the electromagnet initiative vibration damper 104.

The gap value is used to indicate a size of a gap between the electromagnetic piston and the bottom of the cylinder sleeve during the operation the electromagnet initiative vibration damper 104.

It can be seen from the above description that the gap sensor is arranged in the electromagnetic lateral initiative vibration damping system. The gap sensor acquires the gap value during operation of the electromagnet initiative vibration damper, and transmits the acquired gap value to the electromagnet controller. In a case that the electromagnet controller determines that the gap value is equal to the vibration damper target gap value, control on the electromagnet initiative vibration damper is completed, thereby improving the control accuracy of the electromagnetic lateral initiative vibration damping system.

Figure 2:
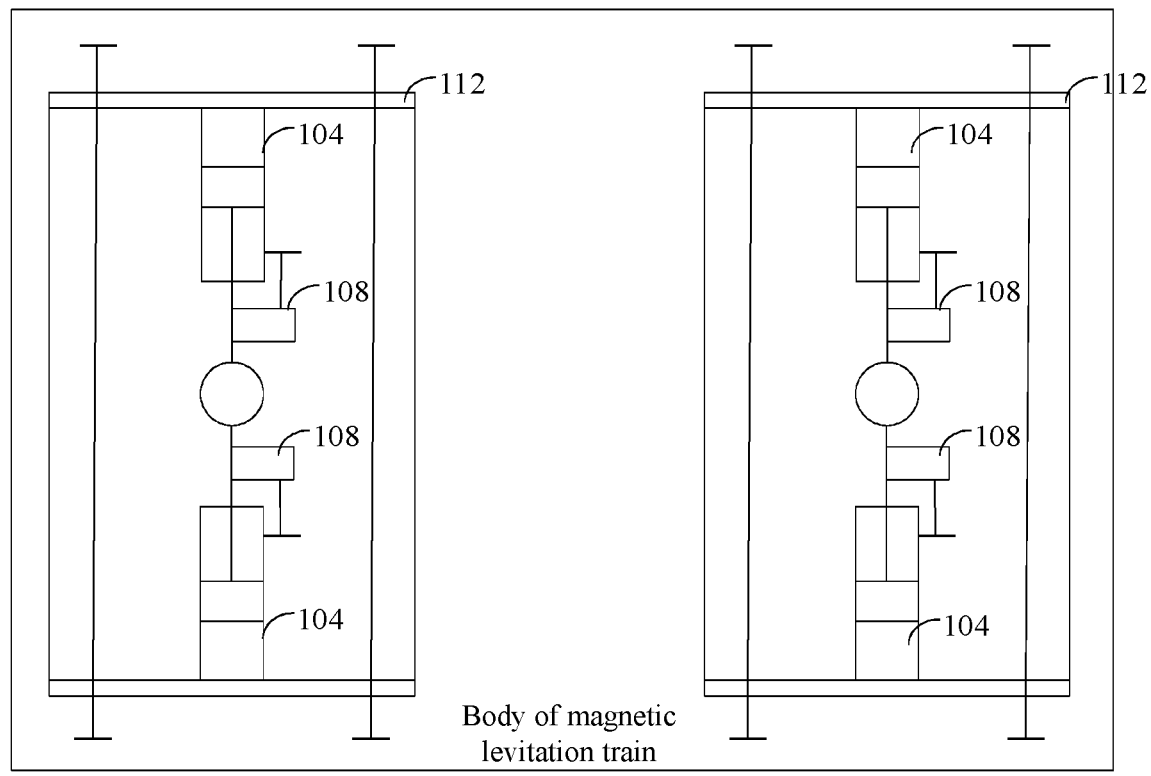
FIG. 2 is a schematic structural diagram of a bogie provided with an electromagnet initiative vibration damper and a gap sensor in the electromagnetic lateral initiative vibration damping system according to the first embodiment of the present disclosure.

In an embodiment, reference is made to FIG. 2, which is a schematic structural diagram of a bogie 112 provided with an electromagnet initiative vibration damper 104 and a gap sensor 108. The electromagnet initiative vibration damper 104 and the gap sensor 108 may be installed on the bogie 112 in other forms, which are not described in detail herein.

It can be seen from FIG. 2 that the two bogies 112 are symmetrically arranged on a body of the magnetic levitation train. Each bogie is symmetrically provided with two electromagnet initiative vibration dampers 104. Each electromagnet initiative vibration damper 104 is connected to one gap sensor 108.

After the electromagnet controller completes the control on the electromagnet initiative vibration damper, the electromagnetic piston of the electromagnet initiative vibration damper returns from the position specified by the vibration damper target gap value in the cylinder sleeve to the default position under the control of the elastic electromagnetic element. Electric energy is generated during the process of returning. In order to store and use the electric energy generated by the electromagnet initiative vibration damper, the electromagnetic lateral initiative vibration damping system according to this embodiment may further include a battery 110. The battery 110 is connected to the electromagnet initiative vibration damper 104.

The electromagnet initiative vibration damper 104 is further configured to, when moving to the position specified by the vibration damper target gap value, automatically return from the position specified by the vibration damper target gap value to the default position, and generate electrical energy and transfer the generated electrical energy to the battery 110.

The battery 110 is configured to store the electrical energy transferred by the electromagnet initiative vibration damper 104.

The battery 110 may be a secondary battery.

The electric energy stored in the battery 110 may be used when the electromagnet controller 100 controls the electromagnet initiative vibration damper 104, or may be provided to other loads of the magnetic levitation train.

It can be seen from the above description that the battery connected to the electromagnet initiative vibration damper is arranged in the electromagnetic lateral initiative vibration damping system. The electric energy transferred by the electromagnet initiative vibration damper is stored in the battery, so that the electromagnetic lateral initiative vibration damping system has a function of energy recovery. The recovered energy may be used by the magnetic levitation train, thereby reducing power consumption of the magnetic levitation train.

Based on the same inventive concept, a method for controlling the electromagnetic lateral initiative vibration damping system is provided according to an embodiment of the present disclosure. A principle of solving a problem in the method according to the embodiment of the present disclosure is similar to the function of the electromagnet controller described in the electromagnetic lateral initiative vibration damping system according to the first embodiment of the present disclosure. Therefore, for implementation of the method in this embodiment, reference may be made to the implementation of the electromagnet controller in the above electromagnetic lateral initiative vibration damping system. Repeated parts are omitted here.

Second Embodiment

A method for controlling an electromagnetic lateral initiative vibration damping system is provided according to this embodiment. An execution subject is the electromagnet controller in the electromagnetic lateral initiative vibration damping system described in the first embodiment.

Figure 3:
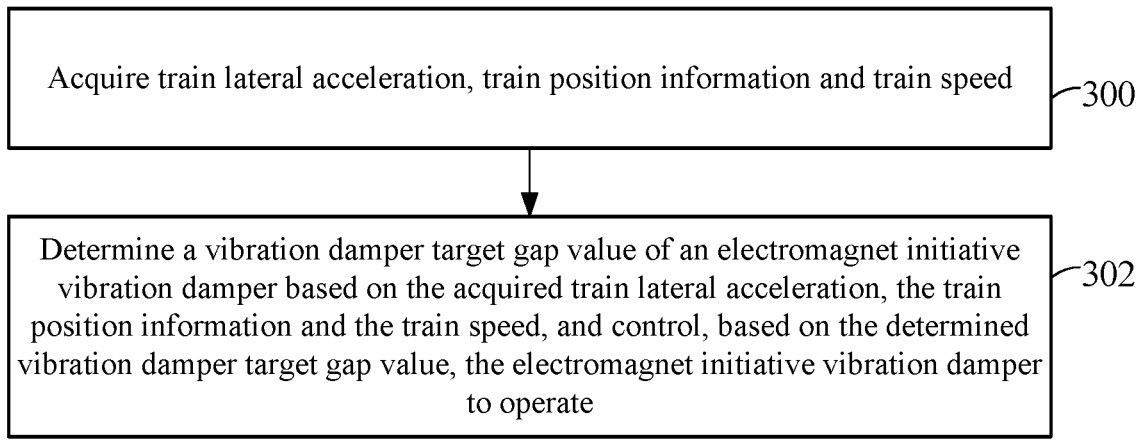
FIG. 3 is a flowchart of a method for controlling an electromagnetic lateral initiative vibration damping system according to a second embodiment of the present disclosure.

Reference is made to FIG. 3, which is a flowchart of a method for controlling an electromagnetic lateral initiative vibration damping system. The method for controlling an electromagnetic lateral initiative vibration damping system according to this embodiment may include the following steps 300 and 302.

In step 300, train lateral acceleration, train position information and train speed are acquired.

In the step 300, the electromagnet controller acquires the train lateral acceleration of a magnetic levitation train via a lateral acceleration sensor arranged in the electromagnetic lateral initiative vibration damping system, and acquires the train position information and the train speed by a computing device arranged in the electromagnetic lateral initiative vibration damping system.

In step 302, a vibration damper target gap value of an electromagnet initiative vibration damper is determined based on the acquired train lateral acceleration, the train position information and the train speed. The electromagnet initiative vibration damper is controlled, based on the determined vibration damper target gap value, to operate.

Specifically, the above step 302 may include the following steps (1) to (6).

In step (1), in a case that there is a vibration damping point that the magnetic levitation train has not passed on a traveling route of the magnetic levitation train, vibration damping point position information of the vibration damping point that the magnetic levitation train has not passed is acquired.

In step (2), a distance between the magnetic levitation train and the vibration damping point that the magnetic levitation train has not passed is calculated based on the train position information and the vibration damping point position information. A vibration damping point closest to the magnetic levitation train is determined based on the calculated distance.

In step (3), a passing time instant when the magnetic levitation train passes the vibration damping point closest to the magnetic levitation train is determined based on the train speed and the distance between the magnetic levitation train and the vibration damping point closest to the magnetic levitation train.

In step (4), lateral acceleration at which the magnetic levitation train passes the vibration damping point closest to the magnetic levitation train is predicted based on the train lateral acceleration and the passing time instant when the magnetic levitation train passes the vibration damping point closest to the magnetic levitation train.

In step (5), in a case that the predicted lateral acceleration is not equal to the train lateral acceleration, a difference between the predicted lateral acceleration and the train lateral acceleration is calculated. The calculated difference is determined as vibration damper vibration offset inertia when the magnetic levitation train passes the vibration damping point closest to the magnetic levitation train.

In step (6), the vibration damper target gap value of the electromagnet initiative vibration damper is determined based on the calculated vibration damper vibration offset inertia. The electromagnet initiative vibration damper is controlled, based on the vibration damper target gap value, to operate.

The above step (4) may include the following steps (41) to (42).

In step (41), the train lateral acceleration and the passing time instant are inputted into a neural network.

In step (42), the lateral acceleration at which the magnetic levitation train passes the vibration damping point closest to the magnetic levitation train is predicted through the neural network.

The above step (6) may include the following steps (61) to step (64).

In step (61), a vibration damper gap and a vibration damper operation duration that are corresponding to the vibration damper vibration offset inertia are determined based on a correspondence among the vibration offset inertia, the vibration damper gap and the vibration damper operation duration.

In step (62), the vibration damper gap corresponding to the vibration damper vibration offset inertia is determined as the vibration damper target gap value of the electromagnet initiative vibration damper.

In step (63), a time instant at which the electromagnet initiative vibration damper operates is determined based on the vibration damper operation duration and the passing time instant when the magnetic levitation train passes the vibration damping point closest to the magnetic levitation train.

In step (64), when the time instant at which the electromagnet initiative vibration damper operates comes, the electromagnet initiative vibration damper is controlled, based on the vibration damper target gap value, to operate.

In summary, with the method for controlling an electromagnetic lateral initiative vibration damping system according to this embodiment, the electromagnet initiative vibration damper is controlled by the electromagnet controller provided in the electromagnetic lateral initiative vibration damping system. Compared with the related technology in which a lateral vibration damping apparatus is controlled by an apparatus or elastic element that generates active force or active torque, the electromagnet controller controls the electromagnet initiative vibration damper in an electronic control manner, which improves a response speed of the electromagnetic lateral initiative vibration damping system, so that the electromagnetic lateral initiative vibration damping system can operate timely at a position where a carriage of a high-speed train tilts or shakes.

Based the same inventive concept, an apparatus for controlling an electromagnetic lateral initiative vibration damping system corresponding to the method for controlling the electromagnetic lateral initiative vibration damping system is provided according to an embodiment of the present disclosure. A principle of solving a problem by the apparatus according to the embodiment of the present disclosure is similar to the function of the electromagnet controller described in the electromagnetic lateral initiative vibration damping system according to the first embodiment of the present disclosure. Therefore, for implementation of the apparatus in this embodiment, reference may be made to the implementation of the electromagnet controller in the above electromagnetic lateral initiative vibration damping system. Repeated parts are omitted here.

Third Embodiment

Figure 4:
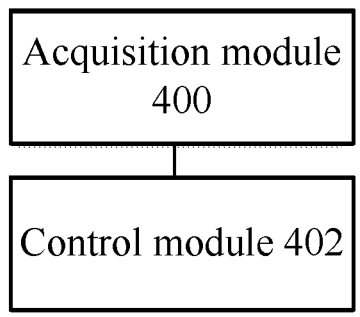
FIG. 4 is a schematic structural diagram of an apparatus for controlling an electromagnetic lateral initiative vibration damping system according to a third embodiment of the present disclosure.

Reference is made to FIG. 4, which is a schematic structural diagram of an apparatus for controlling an electromagnetic lateral initiative vibration damping system. The apparatus for controlling an electromagnetic lateral initiative vibration damping system according to this embodiment includes an acquisition module 400 and a control module 402.

The acquisition module 400 is configured to acquire train lateral acceleration, train position information and train speed.

The control module 402 is configured to determine a vibration damper target gap value of an electromagnet initiative vibration damper based on the acquired train lateral acceleration, the train position information and the train speed, and control, based on the determined vibration damper target gap value, the electromagnet initiative vibration damper to operate.

In this embodiment, the control module 402 is configured to:

in a case that there is a vibration damping point that a magnetic levitation train has not passed on a traveling route of the magnetic levitation train, acquire vibration damping point position information of the vibration damping point that the magnetic levitation train has not passed;

calculate a distance between the magnetic levitation train and the vibration damping point that the magnetic levitation train has not passed based on the train position information and the vibration damping point position information, and determine a vibration damping point closest to the magnetic levitation train based on the calculated distance;

determine a passing time instant when the magnetic levitation train passes the vibration damping point closest to the magnetic levitation train based on the train speed and the distance between the magnetic levitation train and the vibration damping point closest to the magnetic levitation train;

predict lateral acceleration at which the magnetic levitation train passes the vibration damping point closest to the magnetic levitation train based on the train lateral acceleration and the passing time instant when the magnetic levitation train passes the vibration damping point closest to the magnetic levitation train;

calculate a difference between the predicted lateral acceleration and the train lateral acceleration in a case that the predicted lateral acceleration is not equal to the train lateral acceleration, and determine the calculated difference as vibration damper vibration offset inertia when the magnetic levitation train passes the vibration damping point closest to the magnetic levitation train; and determine the vibration damper target gap value of the electromagnet initiative vibration damper based on the calculated vibration damper vibration offset inertia, and control, based on the vibration damper target gap value, the electromagnet initiative vibration damper to operate.

In an embodiment, the control module 402 being configured to predict lateral acceleration at which the magnetic levitation train passes the vibration damping point closest to the magnetic levitation train based on the train lateral acceleration and the passing time instant when the magnetic levitation train passes the vibration damping point closest to the magnetic levitation train includes the control module 402 being configured to:

input the train lateral acceleration and the passing time instant into a neural network; and predict the lateral acceleration at which the magnetic levitation train passes the vibration damping point closest to the magnetic levitation train through the neural network.

In an embodiment, the control module 402 being configured to determine the vibration damper target gap value of the electromagnet initiative vibration damper based on the calculated vibration damper vibration offset inertia, and control, based on the vibration damper target gap value, the electromagnet initiative vibration damper, to operate includes the control module 402 being configured to:

determine a vibration damper gap and a vibration damper operation duration that are corresponding to the vibration damper vibration offset inertia based on a correspondence among the vibration offset inertia, the vibration damper gap and the vibration damper operation duration;

determine the vibration damper gap corresponding to the vibration damper vibration offset inertia as the vibration damper target gap value of the electromagnet initiative vibration damper;

determine a time instant at which the electromagnet initiative vibration damper operates based on the vibration damper operation duration and the passing time instant when the magnetic levitation train passes the vibration damping point closest to the magnetic levitation train; and control, based on the vibration damper target gap value, the electromagnet initiative vibration damper to operate, when the time instant at which the electromagnet initiative vibration damper operates comes.

In summary, with the apparatus for controlling an electromagnetic lateral initiative vibration damping system according to this embodiment, the electromagnet initiative vibration damper is controlled by the electromagnet controller provided in the electromagnetic lateral initiative vibration damping system. Compared with the related technology in which a lateral vibration damping apparatus is controlled by an apparatus or elastic element that generates active force or active torque, the electromagnet controller controls the electromagnet initiative vibration damper in an electronic control manner, which improves a response speed of the electromagnetic lateral initiative vibration damping system, so that the electromagnetic lateral initiative vibration damping system can operate timely at a position where a carriage of a high-speed train tilts or shakes.

Based on the above description of the disclosed embodiments, those skilled in the art can implement or use the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. An electromagnetic lateral initiative vibration damping system, comprising:
an electromagnet controller;
a lateral acceleration sensor;
an electromagnet initiative vibration damper; and
a computing device, wherein the electromagnet controller is connected to the lateral acceleration sensor, the electromagnet initiative vibration damper and the computing device;

the lateral acceleration sensor is configured to acquire train lateral acceleration of a magnetic levitation train and transmit the acquired train lateral acceleration to the electromagnet controller;

the computing device is configured to acquire train position information and a train speed of the magnetic levitation train, and transmit the acquired train position information and train speed to the electromagnet controller;

the electromagnet controller is configured to determine a vibration damper target gap value of the electromagnet initiative vibration damper based on the acquired train lateral acceleration, the train position information and the train speed, and control, based on the determined vibration damper target gap value, the electromagnet initiative vibration damper to operate; and the electromagnet initiative vibration damper is configured to move from a default position to a position specified by the vibration damper target gap value under control of the electromagnet controller, the electromagnetic lateral initiative vibration damping system further comprising:

a gap sensor connected to the electromagnet controller and the electromagnet initiative vibration damper, wherein the gap sensor is configured to acquire a gap value during operation of the electromagnet initiative vibration damper, and transmit the acquired gap value to the electromagnet controller; and the electromagnet controller is further configured to receive the gap value transmitted by the gap sensor; and determine that the electromagnet initiative vibration damper moves to the position specified by the vibration damper target gap value in a case that the gap value is equal to the vibration damper target gap value, to complete control on the electromagnet initiative vibration damper.

2. The electromagnetic lateral initiative vibration damping system according to claim 1, wherein the electromagnet controller being configured to determine a vibration damper target gap value of the electromagnet initiative vibration damper based on the acquired train lateral acceleration, the train position information and the train speed, and control, based on the determined vibration damper target gap value, the electromagnet initiative vibration damper to operate comprises the electromagnet controller being configured to:

in a case that there is a vibration damping point that the magnetic levitation train has not passed on a traveling route of the magnetic levitation train, acquire vibration damping point position information of the vibration damping point that the magnetic levitation train has not passed;

calculate a distance between the magnetic levitation train and the vibration damping point that the magnetic levitation train has not passed based on the train position information and the vibration damping point position information, and determine a vibration damping point closest to the magnetic levitation train based on the calculated distance;

determine a passing time instant when the magnetic levitation train passes the vibration damping point closest to the magnetic levitation train based on the train speed and the distance between the magnetic levitation train and the vibration damping point closest to the magnetic levitation train;

predict lateral acceleration at which the magnetic levitation train passes the vibration damping point closest to the magnetic levitation train based on the train lateral acceleration and the passing time instant when the magnetic levitation train passes the vibration damping point closest to the magnetic levitation train;

calculate a difference between the predicted lateral acceleration and the train lateral acceleration in a case that the predicted lateral acceleration is not equal to the train lateral acceleration, and determine the calculated difference as vibration damper vibration offset inertia when the magnetic levitation train passes the vibration damping point closest to the magnetic levitation train; and determine the vibration damper target gap value of the electromagnet initiative vibration damper based on the calculated vibration damper vibration offset inertia, and control, based on the vibration damper target gap value, the electromagnet initiative vibration damper to operate.

3. The electromagnetic lateral initiative vibration damping system according to claim 2, wherein the electromagnet controller being configured to predict lateral acceleration at which the magnetic levitation train passes the vibration damping point closest to the magnetic levitation train based on the train lateral acceleration and the passing time instant when the magnetic levitation train passes the vibration damping point closest to the magnetic levitation train comprises the electromagnet controller being configured to:

input the train lateral acceleration and the passing time instant into a neural network; and predict the lateral acceleration at which the magnetic levitation train passes the vibration damping point closest to the magnetic levitation train through the neural network.

4. The electromagnetic lateral initiative vibration damping system according to claim 2, wherein the electromagnet controller being configured to determine the vibration damper target gap value of the electromagnet initiative vibration damper based on the calculated vibration damper vibration offset inertia, and control, based on the vibration damper target gap value, the electromagnet initiative vibration damper to operate comprises the electromagnet controller being configured to:

determine a vibration damper gap and a vibration damper operation duration that are corresponding to the vibration damper vibration offset inertia based on a correspondence among the vibration offset inertia, the vibration damper gap and the vibration damper operation duration;

determine the vibration damper gap corresponding to the vibration damper vibration offset inertia as the vibration damper target gap value of the electromagnet initiative vibration damper;

determine a time instant at which the electromagnet initiative vibration damper operates based on the vibration damper operation duration and the passing time instant when the magnetic levitation train passes the vibration damping point closest to the magnetic levitation train; and control, based on the vibration damper target gap value, the electromagnet initiative vibration damper to operate, when the time instant at which the electromagnet initiative vibration damper operates comes.

5. The electromagnetic lateral initiative vibration damping system according to claim 1, further comprising:
a battery connected to the electromagnet initiative vibration damper, wherein
the electromagnet initiative vibration damper is further configured to, when moving to the position specified by the vibration damper target gap value, automatically return from the position specified by the vibration damper target gap value to the default position and generate electrical energy, and transfer the generated electrical energy to the battery; and
the battery is configured to store the electrical energy transferred by the electromagnet initiative vibration damper.

6. A method for controlling an electromagnetic lateral initiative vibration damping system, comprising:
acquiring train lateral acceleration, train position information and train speed; and
determining a vibration damper target gap value of an electromagnet initiative vibration damper based on the acquired train lateral acceleration, the train position information and the train speed, and controlling, based on the determined vibration damper target gap value, the electromagnet initiative vibration damper to operate,
the method further comprising:
acquiring a gap value during operation of the electromagnet initiative vibration damper, and determining that the electromagnet initiative vibration damper moves to the position specified by the vibration damper target gap value in a case that the gap value is equal to the vibration damper target gap value, to complete control on the electromagnet initiative vibration damper.

7. The method for controlling an electromagnetic lateral initiative vibration damping system according to claim 6, wherein the determining a vibration damper target gap value of an electromagnet initiative vibration damper based on the acquired train lateral acceleration, the train position information and the train speed, and controlling, based on the determined vibration damper target gap value, the electromagnet initiative vibration damper to operate comprises:
in a case that there is a vibration damping point that a magnetic levitation train has not passed on a traveling route of the magnetic levitation train, acquiring vibration damping point position information of the vibration damping point that the magnetic levitation train has not passed;
calculating a distance between the magnetic levitation train and the vibration damping point that the magnetic levitation train has not passed based on the train position information and the vibration damping point position information, and determining a vibration damping point closest to the magnetic levitation train based on the calculated distance;
determining a passing time instant when the magnetic levitation train passes the vibration damping point closest to the magnetic levitation train based on the train speed and the distance between the magnetic levitation train and the vibration damping point closest to the magnetic levitation train;
predicting lateral acceleration at which the magnetic levitation train passes the vibration damping point closest to the magnetic levitation train based on the train lateral acceleration and the passing time instant when the magnetic levitation train passes the vibration damping point closest to the magnetic levitation train;
calculating a difference between the predicted lateral acceleration and the train lateral acceleration in a case that the predicted lateral acceleration is not equal to the train lateral acceleration, and determining the calculated difference as vibration damper vibration offset inertia when the magnetic levitation train passes the vibration damping point closest to the magnetic levitation train; and
determining the vibration damper target gap value of the electromagnet initiative vibration damper based on the calculated vibration damper vibration offset inertia, and controlling, based on the vibration damper target gap value, the electromagnet initiative vibration damper to operate.

8. The method for controlling an electromagnetic lateral initiative vibration damping system according to claim 7, wherein the predicting lateral acceleration at which the magnetic levitation train passes the vibration damping point closest to the magnetic levitation train based on the train lateral acceleration and the passing time instant when the magnetic levitation train passes the vibration damping point closest to the magnetic levitation train comprises:
inputting the train lateral acceleration and the passing time instant into a neural network;
and predicting the lateral acceleration at which the magnetic levitation train passes the vibration damping point closest to the magnetic levitation train through the neural network.

9. The method for controlling an electromagnetic lateral initiative vibration damping system according to claim 7, wherein the determining the vibration damper target gap value of the electromagnet initiative vibration damper based on the calculated vibration damper vibration offset inertia, and controlling, based on the vibration damper target gap value, the electromagnet initiative vibration damper to operate comprises:
determining a vibration damper gap and a vibration damper operation duration that are corresponding to the vibration damper vibration offset inertia based on a correspondence among the vibration offset inertia, the vibration damper gap and the vibration damper operation duration;
determining the vibration damper gap corresponding to the vibration damper vibration offset inertia as the vibration damper target gap value of the electromagnet initiative vibration damper;
determining a time instant at which the electromagnet initiative vibration damper operates based on the vibration damper operation duration and the passing time instant when the magnetic levitation train passes the vibration damping point closest to the magnetic levitation train; and
controlling, based on the vibration damper target gap value, the electromagnet initiative vibration damper to operate, when the time instant at which the electromagnet initiative vibration damper operates comes.

10. An apparatus for controlling an electromagnetic lateral initiative vibration damping system, comprising:
an acquisition module configured to acquire train lateral acceleration, train position information and train speed; and
a control module configured to determine a vibration damper target gap value of an electromagnet initiative vibration damper based on the acquired train lateral acceleration, the train position information and the train speed, and control, based on the determined vibration damper target gap value, the electromagnet initiative vibration damper to operate, wherein the acquisition module is further configured to acquire a gap value during operation of the electromagnet initiative vibration damper; and the control module is further configured to determine that the electromagnet initiative vibration damper moves to the position specified by the vibration damper target gap value in a case that the gap value is equal to the vibration damper target gap value, to complete control on the electromagnet initiative vibration damper.

11. The apparatus for controlling an electromagnetic lateral initiative vibration damping system according to claim 10, wherein the control module is configured to:

in a case that there is a vibration damping point that a magnetic levitation train has not passed on a traveling route of the magnetic levitation train, acquire vibration damping point position information of the vibration damping point that the magnetic levitation train has not passed;

calculate a distance between the magnetic levitation train and the vibration damping point that the magnetic levitation train has not passed based on the train position information and the vibration damping point position information, and determine a vibration damping point closest to the magnetic levitation train based on the calculated distance;

determine a passing time instant when the magnetic levitation train passes the vibration damping point closest to the magnetic levitation train based on the train speed and the distance between the magnetic levitation train and the vibration damping point closest to the magnetic levitation train;

predict lateral acceleration at which the magnetic levitation train passes the vibration damping point closest to the magnetic levitation train based on the train lateral acceleration and the passing time instant when the magnetic levitation train passes the vibration damping point closest to the magnetic levitation train;

calculate a difference between the predicted lateral acceleration and the train lateral acceleration in a case that the predicted lateral acceleration is not equal to the train lateral acceleration, and determine the calculated difference as vibration damper vibration offset inertia when the magnetic levitation train passes the vibration damping point closest to the magnetic levitation train; and determine the vibration damper target gap value of the electromagnet initiative vibration damper based on the calculated vibration damper vibration offset inertia, and control, based on the vibration damper target gap value, the electromagnet initiative vibration damper to operate.

12. The apparatus for controlling an electromagnetic lateral initiative vibration damping system according to claim 11, wherein the control module being configured to predict lateral acceleration at which the magnetic levitation train passes the vibration damping point closest to the magnetic levitation train based on the train lateral acceleration and the passing time instant when the magnetic levitation train passes the vibration damping point closest to the magnetic levitation train comprises the control module being configured to:

input the train lateral acceleration and the passing time instant into a neural network; and predict the lateral acceleration at which the magnetic levitation train passes the vibration damping point closest to the magnetic levitation train through the neural network.

13. The apparatus for controlling an electromagnetic lateral initiative vibration damping system according to claim 11, wherein the control module being configured to determine the vibration damper target gap value of the electromagnet initiative vibration damper based on the calculated vibration damper vibration offset inertia, and control, based on the vibration damper target gap value, the electromagnet initiative vibration damper to operate comprises the control module being configured to:

determine a vibration damper gap and a vibration damper operation duration that are corresponding to the vibration damper vibration offset inertia based on a correspondence among the vibration offset inertia, the vibration damper gap and the vibration damper operation duration;

determine the vibration damper gap corresponding to the vibration damper vibration offset inertia as the vibration damper target gap value of the electromagnet initiative vibration damper;

determine a time instant at which the electromagnet initiative vibration damper operates based on the vibration damper operation duration and the passing time instant when the magnetic levitation train passes the vibration damping point closest to the magnetic levitation train; and control, based on the vibration damper target gap value, the electromagnet initiative vibration damper to operate, when the time instant at which the electromagnet initiative vibration damper operates comes.

* * * * *